(12) United States Patent
Hirota et al.

(10) Patent No.: US 6,852,428 B2
(45) Date of Patent: Feb. 8, 2005

(54) LAYERED HEAT-RESISTANT ALLOY PLATE AND METHOD OF PRODUCING THE SAME

(75) Inventors: Norihide Hirota, Takasago (JP); Yusaku Sugimoto, Takasago (JP); Kazuhiko Hasegawa, Himeji (JP)

(73) Assignees: Mitsubishi Heavy Industries, Ltd., Tokyo (JP); Kinzoku Giken Co., Ltd., Tokyo (JP)

(*) Notice: Subject to any disclaimer, the term of this patent is extended or adjusted under 35 U.S.C. 154(b) by 0 days.

(21) Appl. No.: 10/343,746
(22) PCT Filed: Nov. 15, 2001
(86) PCT No.: PCT/JP01/09977
  § 371 (c)(1),
  (2), (4) Date: Feb. 6, 2003
(87) PCT Pub. No.: WO02/42031
  PCT Pub. Date: May 30, 2002

(65) Prior Publication Data
  US 2003/0186076 A1 Oct. 2, 2003

(30) Foreign Application Priority Data
  Nov. 27, 2000 (JP) ........................................ 2000-359197

(51) Int. Cl.⁷ .............................. B32B 3/30; B23K 1/00
(52) U.S. Cl. ...................... 428/680; 428/600; 428/609; 228/190; 228/183; 228/245; 228/262.31; 148/528
(58) Field of Search ................................ 428/600, 680, 428/596, 586, 609; 228/181, 182, 190, 186, 245, 252, 262.3, 262.31, 183; 148/528

(56) References Cited

U.S. PATENT DOCUMENTS

| | | | | |
|---|---|---|---|---|
| 4,189,656 A | * | 2/1980 | Biricik et al. | 313/37 |
| 4,611,752 A | * | 9/1986 | Jahnke | 228/194 |
| 4,801,072 A | * | 1/1989 | Henschel | 228/245 |
| 5,192,623 A | * | 3/1993 | Gewelber | 428/593 |
| 6,609,650 B2 | * | 8/2003 | Rabinkin et al. | 228/178 |

FOREIGN PATENT DOCUMENTS

| | | | |
|---|---|---|---|
| JP | 64-48697 | | 2/1989 |
| JP | 64-048696 | * | 2/1989 |
| JP | 1-186290 | | 7/1989 |
| JP | 6-67551 | | 8/1994 |
| JP | 7-256482 | | 10/1995 |
| JP | 2000-249487 | | 9/2000 |

* cited by examiner

*Primary Examiner*—John J. Zimmerman
(74) *Attorney, Agent, or Firm*—Oblon Spivak, McClelland, Maier & Neustadt, P.C.

(57) ABSTRACT

Objects of the present invention are to provide a laminated heat resistant alloy plate has a large area, and to provide a manufacturing method therefor. The laminated heat resistant alloy plate according to the present invention is obtained by brazing a Ni alloy plate having plural striae formed thereon at a predetermined interval and a plate which is made of a material the same as or different from that of the Ni alloy plate with a sheet of Ni solder which is amorphous and does not contain organic binder.

7 Claims, 3 Drawing Sheets

LAYERED HEAT-RESISTANT ALLOY PLATE AND METHOD OF PRODUCING THE SAME

BACKGROUND OF THE INVENTION

1. Field of the Invention

The present invention relates to a laminated heat resistant alloy plate which is used for cooling a combuster of a gas turbine or a jet engine and the like.

2. Description of the Related Art

FIG. 1 shows an example of a laminated heat resistant alloy plate which is used for cooling a combustion basket or a transition piece of a combustor of a gas turbine or a jet engine and the like. In the figure, on an upper face of a fin portion of a heat resistant alloy plate 1 in which striae A are formed and cooling holes B are bored, a heat resistant alloy plate 2 in which only cooling holes C are bored and made of a material the same as or different from that of the heat resistant alloy plate 1 is brazed with nickel braze (not shown). In the laminated heat resistant alloy plate having this structure, cooling air cools the heat resistant alloy plates 1 and 2 when it enters in the striae A through the cooling holes C and is sent to the interior of the combustor through the cooling holes B. Furthermore, FIG. 2 is an enlarged view of a part of a side cross section of FIG. 1. By employing this laminated heat resistant alloy plate for a member of the combustion basket or the transition piece of the combustor, these members can be efficiently cooled by a small quantity of cooling air.

The laminated heat resistant alloy plate as described above is manufactured through the following processes: (1) forming the striae on a Ni alloy plate having appropriate thickness by a cutter having predetermined width, (2) superimposing this striated plate on a plate which is made of a material the same as or different from that of the striated plate with the Ni solder and setting them at a predetermined position so as to face the striae downward, (3) adding a load of 30 g/cm$^2$ or more on the striated plate uniformly by dividing the load using small blocks which respectively have loading areas of 15 cm$^2$ and less; and (4) performing a heat treatment at 1000±20° C. for 5 to 60 minutes, (5) performing a heat treatment at 1050 to 1150° C. for 15 to 60 minutes, and (6) performing a heat treatment at 1060 to 1140° C. for 2 hours or more, in an inert gas atmosphere or vacuum (See Japanese Patent Application, Second Publication, No. Hei 6-67551).

Conventionally, the maximum size of a laminated heat resistant alloy plate which is required for use for a combustor of a gas turbine is, for example, about 300 mm×300 mm, and in the case of brazing the laminated heat resistant alloy plate whose size is about 300 mm×300 mm, brazing with sufficient strength can be performed by means of the above loading condition and heat treatments under the conditions of heating temperature and time in the inert gas or vacuum. However, demand for the laminated heat resistant alloy plate whose size is about 400 mm×400 mm or more has increased in recent years as a result of increase in areas which require cooling in the combustor of the gas turbine in accordance with increases in the inlet temperature of the gas turbine. If this size of laminated heat resistant alloy plate is manufactured by the above conventional method, the strength of a brazed portion thereof may become sufficient and exfoliation may occur in the brazed portion.

Furthermore, a sheet shaped solid which is composed of a mixture of powder of Ni braze "BNi—2" based on Japanese Industrial Standard, JIS Z 3265, and acrylic resins as a binder with a ratio of 10:1 by weight is conventionally used as the braze. However, in this braze, it is difficult to maintain uniform thickness of the sheet, and internal defects due to the gas generated by the heat treatment may easily remain. Therefore, even when a laminated heat resistant alloy plate of a size of about 300 mm×300 mm is manufactured, the exfoliation may occur unless the load of 30 g/cm$^2$ or more on the plate is divided with small areas of 15 cm$^2$ and less.

SUMMARY OF THE INVENTION

The present invention is performed in view of the above technical circumstances, and objects of the present invention are to provide a laminated heat resistant alloy plate which has a large area to satisfying the demand for increase of areas which need cooling in the combustor of the gas turbine or the jet engine and the like, and to provide a manufacturing method therefor.

A laminated heat resistant alloy plate according to the present invention is characterized by comprising a Ni alloy plate having plural striae formed thereon at a predetermined interval, and a plate which is made of a material the same as or different from that of the Ni alloy plate and is brazed onto the Ni alloy plate with a sheet of Ni braze which is amorphous and does not contain organic binder.

Furthermore, a method for manufacturing laminated heat resistant alloy plate according to the present invention is characterized in that the plate is manufactured by brazing a Ni alloy plate having plural striae formed thereon at a predetermined interval and a plate which is made of a material the same as or different from that of the Ni alloy plate with a sheet of Ni braze which is amorphous and does not contain organic binder.

In addition, the method for manufacturing laminated heat resistant alloy plate according to the present invention is characterized by comprising steps of: forming a plurality of striae at a predetermined interval on a Ni alloy plate having a thickness of 0.5 mm to 5.0 mm; superimposing a plate which is made of a material the same as or different from that of the striated plate onto the striated plate so as to cover the striae through a sheet of Ni braze which is amorphous and does not contain organic binder and setting them at a predetermined position so as to face the striae downward; adding a load of 30 g/cm$^2$ or more on the striated plate uniformly by dividing the load using small blocks which respectively have loading areas of 30 cm$^2$ and less; performing a heat treatment at 980 to 1020° C. for 5 to 60 minutes; performing a heat treatment at 1050 to 1150° C. for 2 hours or more; and performing a heat treatment at a temperature of 1100 to 1200° C. and which is higher than the temperature of the above heat treatment for 2 hours or more for 15 to 60 minutes, in an inert gas atmosphere or a vacuum.

In the method for manufacturing laminated heat resistant alloy plate, it is preferable that a circumference of a brazed surface of the Ni alloy plate or upper plate is coated by a braze leakage inhibitor.

According to the present invention, both the conventional laminated heat resistant alloy plate of a size of about 300 mm×300 mm and the laminated heat resistant alloy plate of a size of about 400 mm×400 mm or more which shows a superior lamination condition as well as the above relatively small conventional plate can be provided with a production efficiency higher than the conventional method for manufacturing the laminated heat resistant alloy plate.

That is, in the conventional manufacturing method, since each area for adding a load of 30 g/cm$^2$ or more is 15 cm$^2$ and less for brazing the Ni alloy plate and upper plate, the production efficiency is not high. In contrast, since each area for adding a load of 30 g/cm² or more can be enlarged to 30 cm², the production efficiency is improved.

The reason is described as follows. In the conventional method, since a mixture of powder of the Ni braze "BNi—2" based on Japanese Industrial Standard, JIS Z 3265, and acrylic resins as a binder with a ratio of 10:1 by weight is used as the braze, it is difficult to maintain uniform thickness of the sheet of braze, and as a result, each area for adding the load must be made small. In contrast, in the method of the present invention, since Ni braze which is amorphous and does not contain organic binder (the sheet of braze produced by quenching the Ni braze "BNi—2" based on Japanese Industrial Standard, JIS Z 3265, for example) is used as the braze, the thickness of the sheet of braze becomes uniform, and as a result, each area for adding the load can be enlarged to 30 cm².

BRIEF DESCRIPTION OF THE DRAWINGS

FIG. 1 is a perspective view of a laminated heat resistant alloy plate which is used for cooling a combustion basket or a transition piece of a combustor of a gas turbine or a jet engine and the like.

DETAILED DESCRIPTION OF THE PREFERRED EMBODIMENTS

In the present invention, a sheet shaped braze which is amorphous and does not contain organic binder is used. This sheet of braze can be produced by melting a material which is composed of elements used as Ni braze, and by shaping into a sheet by means of quenching using a cooling roller. The above described Ni braze "BNi—2" based on Japanese Industrial Standard JIS Z 3265 (which is composed of 6–8% of Cr, 4–5% of Si, 2.75–3.5% of B, 2.5–3.5% of Fe, 0.06% and less of Co, 0.02% and less of P, 0.5% and less of other inevitable elements, and residual Ni, in percentage by weight) can be used as the material of the braze, for example.

Figure 1:
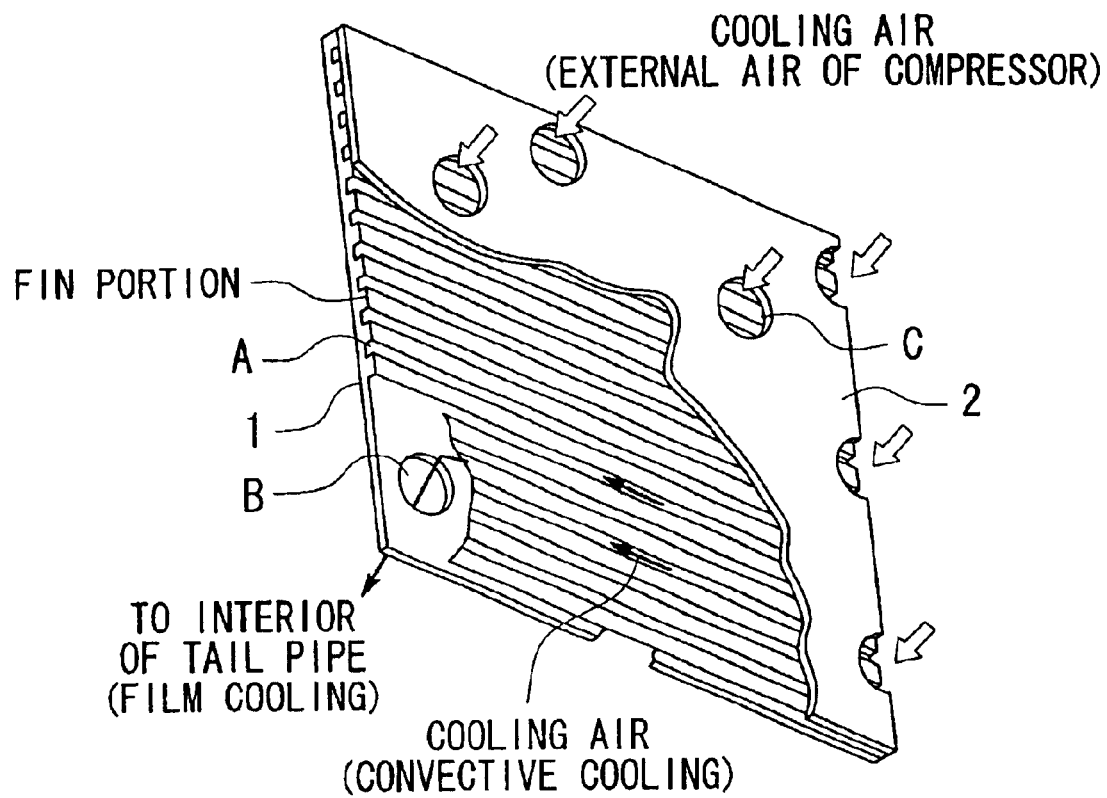
Figure 2:
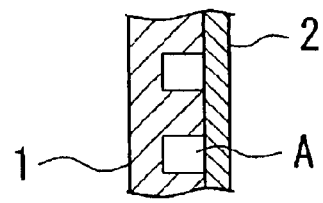
FIG. 2 is a partial enlarged view of a side cross section of the unlimited heat resistant alloy plate shown in FIG. 1.
Figure 3:
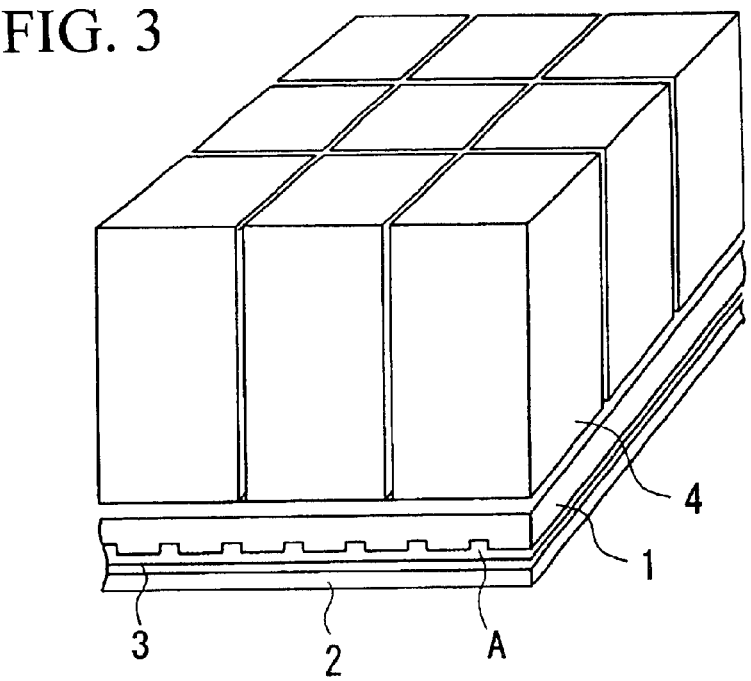
FIG. 3 is a perspective view of a laminated heat resistant alloy plate according to the present invention under in a loaded condition.

The present invention will be explained as follows with reference to FIG. 3. FIG. 3 shows a striated plate 1 in which striae A are formed thereon, an upper plate 2 which covers the striated plate 1, a sheet of Ni braze 3 which is amorphous and does not contain organic binder (hereinafter called "braze"), and loading blocks 4. An outer circumference of the braze, which is amorphous and does not contain organic binder, is sandwiched between the striated plate 1 and upper plate 2 and is coated with a braze leakage inhibitor (not shown).

In the case of manufacturing the laminated heat resistant alloy plate, the braze 3 is provided between the striated plate 1 and upper plate 2, and an outer end portion of surfaces thereof which are brazed by the braze 3 is coated by the braze leakage inhibitor, and then, these plates are set at a predetermined position so as to position the upper plate 2 downward before the following pressing and heat treatment. These steps are performed so as not to flow the braze 3 into the striae A and not to leak the braze 3 outward.

Next, a load of 30 g/cm² or more is uniformly added on the striated plate 1 by dividing the load using small blocks which respectively have loading areas of 30 cm² and less, and heat treatments are performed in an inert gas atmosphere or vacuum by performing a heat treatment at 1000±20° C. for 5 to 60 minutes (first heat treatment), a heat treatment at 1050 to 1150° C. for 2 hours or more (second heat treatment), and a heat treatment with temperature of 1100 to 1200° C. which is higher than the temperature of the second heat treatment for 15 to 60 minutes (third heat treatment) in series.

The first heat treatment is performed in order to recover from the partial delay of raising the temperature in a heating chamber for equalizing the temperature in the chamber and to diffuse gaseous elements which adhere on the surface of the striated plate 1 and upper plate 2. The second heat treatment is performed in order to braze the plates by heating the braze 3 above the melting point thereof. Furthermore, the third heat treatment is performed in order to dissolve eutectic structures such as Ni—Si or Ni—B and the like by diffusing the braze 3 sufficiently.

The following is an example for explaining effects of the present invention.

A laminated heat resistant alloy plate is manufactured by using Ni alloy plates which is composed of elements shown in the following table 1 as the upper plate and striated plate. The size of the upper plate and striated plate are each 400 mm×420 mm, and thicknesses of the upper plate and the striated plate are 1.6 mm and 3.2 mm, respectively. The striae are formed by a cutter and the width of each stria is 1.6 mm and the depth thereof is 1.6 mm. In addition, tolerances of each stria are ±0.1 mm in width and ±0.4 mm in depth.

TABLE 1

| composition (%) | | | | | | |
| --- | --- | --- | --- | --- | --- | --- |
| C | Cr | Ni | Co | Mo | W | Fe |
| 0.10 | 22.0 | residue | 1.5 | 9.0 | 0.6 | 18.5 |

Next by using a sheet of braze which is amorphous and does not contain organic binder (Ni braze "BNi—2" having the above described composition based on Japanese Industrial Standard, JIS Z 3265), the upper plate, the sheet of braze, and the striated plate are laminated in this order, and then this laminated plate is set at a predetermined position so as to face the striae downward. Furthermore, a load of 50 g/cm² is uniformly added on the laminated plate by dividing the load into areas of 30 cm², together with a heat history which is composed of a heat treatment at 1000° C. for 30 minutes, a heat treatment at 1100° C. for 4 hours, and a heat treatment at 1155° C. for 15 minutes is performed for brazing. In addition, circumference of holes such as cooling holes of the upper plate and an outer end portion of a brazed surface of the striated plate are coated by a braze leakage inhibitor ("L—BN spray" produced by Japan Graphite Industries, Ltd. which is composed of 40% of methyl ethyl ketone and 60% of BN powder) in order to inhibit the leakage of the braze, and as a result, adherence between the laminated plate and a jig for manufacturing the plate by surplus braze is inhibited.

Figure 4:
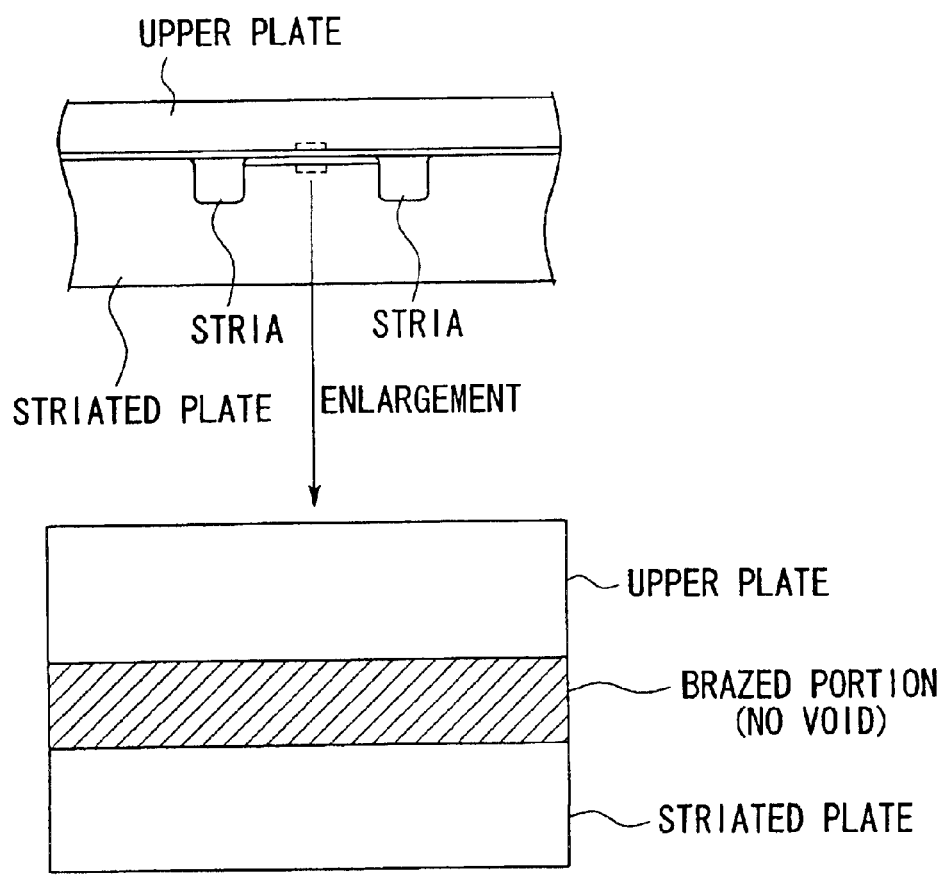
FIG. 4 is a drawing which shows an example of a brazed portion of an embodiment of a laminated heat resistant alloy plate according to the present invention.
Figure 5:
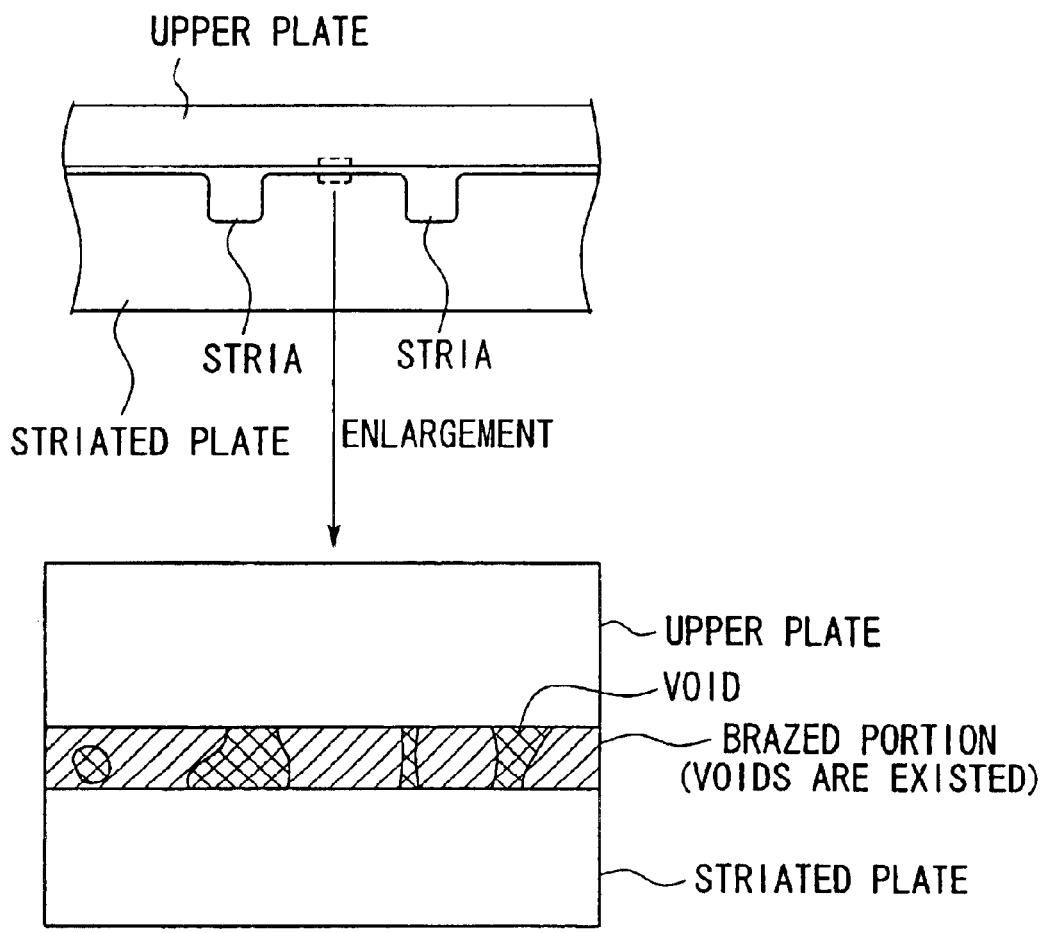
FIG. 5 is a drawing which shows an example of a brazed portion of a laminated heat resistant alloy plate which is manufactured by a conventional manufacturing method.

Consequently, as shown in FIG. 4, in the method of the present invention, no voids occur in a brazed portion between the upper plate and striated plate, and the brazing is adequately preformed. In contrast, in the conventional method, gases may be produced in the brazed portion since the braze contains organic binder, and as a result, as shown in FIG. 5, voids occur in the brazed portion and the braze between the upper plate and striated plate cannot be adequately performed.

As described above, by employing the method of the present invention, no inferior brazing is produced even when manufacturing a relatively large alloy plate, and a laminated heat resistant alloy plate of high quality can be manufactured. In addition, the production efficiency of the manufacturing method can also be remarkably improved.

What is claimed is:

1. A method for manufacturing laminated heat resistant alloy plate comprising:

forming a plurality of striae at a predetermined interval on a Ni alloy plate having a thickness of 0.5 mm to 5.0 mm;

superimposing a plate which is made of a material the same as or different from that of this striated plate onto the striated plate so as to cover and striae through a sheet of Ni braze which is amorphous and does not contain organic binder; and setting them at predetermined position so as to face the striae downward, adding a load of 30 g/cm$^2$ or more on said striated plate uniformly by dividing the load using small blocks which respectively have loading areas of 30 cm$^2$ and less, heat treating at temperature of 980 to 1020° C. for 5 to 60 minutes, heat treating at temperature of 1050 to 1150° C. for 2 hours or more, and heat treating at temperature of 1100 to 1200° C. which is higher than the temperature of said heat treatment for 2 hours or more for 15 to 60 minutes, in an inert gas atmosphere or a vacuum.

2. The method for manufacturing laminated heat resistant alloy plate according to claim 1, wherein the circumference of a brazed surface of said Ni alloy plate or said upper plate is coated by braze leakage inhibitor.

3. The method for manufacturing laminated heat resistant alloy plate according to claim 1, wherein adding the load on said striated plate uniformly by dividing the load using small blocks which respectively have loading areas of 15 cm$^2$ to 30 cm$^2$.

4. A laminated heat resistant alloy plate manufactured by the method according to claim 1.

5. A laminated heat resistant alloy plate manufacturing by the method according to claim 2.

6. A laminated heat resistant alloy plate manufactured by the method according to claim 3.

7. A method for manufacturing laminated heat resistant alloy plate comprising:

forming a plurality of a striae at a predetermined interval on a Ni alloy plate having a thickness of 0.5 mm to 5.0 mm;

superimposing a plate which is made of a material the same as or different from that of this striated plate onto the striated plate so as to cover said striae through a sheet of Ni braze which is amorphous and does not contain organic binder; and setting them at a predetermined position so as to face the striae downward, adding a load of 30 g/cm$^2$ or more on said striated plate uniformly by dividing the load using small blocks which respectively have loading areas of 30 cm$^2$ and less, heat treating at temperature 980 to 1020° C. for 5 to 60 minutes, then heat treating at temperature of 1050 to 1150° C. for 2 hours or more, and then heat treating at temperature of 1100 to 1200° C. which is higher than the temperature of said heat treatment for 2 hours or more for 15 to 60 minutes, in an inert gas atmosphere or a vacuum.

* * * * *